US012797912B2

(12) United States Patent
Kim et al.

(10) Patent No.: US 12,797,912 B2
(45) Date of Patent: Nov. 17, 2026

(54) BRUSH PROCESSING APPARATUS AND BRUSH PROCESSING METHOD USING THE SAME

(71) Applicant: Samsung Electronics Co., Ltd., Suwon-si (KR)

(72) Inventors: Heegeun Kim, Suwon-si (KR); Donghoon Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 26 days.

(21) Appl. No.: 18/812,203

(22) Filed: Aug. 22, 2024

(65) Prior Publication Data

US 2025/0269407 A1 Aug. 28, 2025

(30) Foreign Application Priority Data

Feb. 27, 2024 (KR) ........................ 10-2024-0028248

(51) Int. Cl.
*B08B 1/52* (2024.01)
*B08B 3/02* (2006.01)
*B08B 15/04* (2006.01)

(52) U.S. Cl.
CPC .................. *B08B 1/52* (2024.01); *B08B 3/02* (2013.01); *B08B 15/04* (2013.01)

(58) Field of Classification Search
CPC .............. B08B 1/52; B08B 3/02; B08B 15/04
See application file for complete search history.

(56) References Cited

U.S. PATENT DOCUMENTS

| | | | | |
|---|---|---|---|---|
| 5,178,134 | A * | 1/1993 | Vago | A61H 23/0245 601/2 |
| 5,974,868 | A | 11/1999 | Decain et al. | |
| 9,211,568 | B2 | 12/2015 | Chang | |
| 10,170,343 | B1 * | 1/2019 | Wei | H10P 72/0412 |
| 11,060,051 | B2 | 7/2021 | Grandstrom et al. | |
| 2018/0337102 | A1 | 11/2018 | Withers et al. | |
| 2019/0168265 | A1 | 6/2019 | White | |
| 2020/0281347 | A1 | 9/2020 | Park et al. | |

FOREIGN PATENT DOCUMENTS

| | | | |
|---|---|---|---|
| JP | 2004105848 | A | 4/2004 |
| JP | 2023018185 | A | 2/2023 |
| KR | 101594703 | B1 | 2/2016 |
| KR | 1020190033339 | B1 | 9/2019 |
| KR | 102237311 | B1 | 4/2021 |
| KR | 102421566 | | 7/2022 |
| KR | 1020220137135 | A | 10/2022 |

* cited by examiner

*Primary Examiner* — Natasha N Campbell
(74) *Attorney, Agent, or Firm* — Muir Patent Law, PLLC

(57) ABSTRACT

A brush processing apparatus includes a particle collection platform having a rectangular prism shape, at least one coil inside the particle collection platform and configured to generate a magnetic field, a spray nozzle configured to spray fluid to clean a brush, and a sensor configured to analyze particles collected on the particle collection platform.

13 Claims, 17 Drawing Sheets

BRUSH PROCESSING APPARATUS AND BRUSH PROCESSING METHOD USING THE SAME

CROSS-REFERENCE TO RELATED APPLICATION

This U.S. non-provisional patent application claims priority under 35 U.S.C. § 119 to Korean Patent Application No. 10-2024-0028248, filed on Feb. 27, 2024, in the Korean Intellectual Property Office, the entire contents of which are hereby incorporated by reference.

BACKGROUND OF THE INVENTION

Aspects of the inventive concept relate to a brush processing apparatus and a brush processing method using the same and more specifically, relate to a brush processing apparatus capable of removing particles attached to a surface of a brush and measuring the amount of particles and a brush processing method using the same.

Semiconductor devices may be manufactured through several processes. When a semiconductor process progresses, various fluids or particles may adhere to the substrate, thereby contaminating a surface of the substrate. When the next process is performed while the surface of the substrate is contaminated, there is a risk that semiconductor quality may deteriorate or defects may occur. Therefore, the substrate should be cleaned periodically. There may be several ways to clean the substrate. For example, the substrate may be cleaned using a supercritical fluid, fluid, gas, etc., or the substrate may be physically cleaned using a brush. When the brush is contaminated, there is a risk of reverse contamination of the substrate, and thus it may be desirable to periodically manage the contamination degree of the brush and/or to replace the brush.

SUMMARY

An object of the inventive concept is to provide a brush processing apparatus capable of removing particles attached to a brush and a brush processing method using the same.

An object of the inventive concept is to provide a brush processing apparatus capable of measuring the amount of particles attached to a brush and a brush processing method using the same.

An object of the inventive concept is to provide a brush processing apparatus capable of collecting particles into a specific region and a brush processing method using the same.

An object of the inventive concept is to provide a brush processing apparatus capable of measuring the amount of particles by measuring a temperature of the particles, a wavelength of light, and a magnetization of the particles, and a brush processing method using the same.

An object of the inventive concept is to provide a brush processing apparatus preventing reverse contamination of a substrate by measuring the amount of particles in a brush and suggesting a brush replacement cycle in advance before the brush becomes severely contaminated, and a brush processing method using the same.

The problem to be solved by the inventive concept is not limited to the problems mentioned above, and other problems not mentioned will be clearly understood by those skilled in the art from the description below.

A brush processing apparatus according to some embodiments of the inventive concept may include a particle collection platform having a rectangular prism shape; at least one coil inside the particle collection platform and configured to generate a magnetic field; a spray nozzle configured to spray fluid to clean a brush; and a sensor configured to analyze particles collected on the particle collection platform.

A brush processing apparatus according to some embodiments of the inventive concept may include a particle collection platform having a rectangular prism shape or a plate shape; a plurality of coils inside the particle collection platform and configured to generate a magnetic field; a spray nozzle configured to spray fluid toward the particle collection platform; and a sensor configured to analyze particles collected on the particle collection platform.

A brush processing method according to some embodiments of the inventive concept may include placing a brush on a brush processing apparatus, the brush processing apparatus including a particle collection platform having a rectangular prism shape, at least one coil inside the particle collection platform, a spray nozzle, and a sensor; generating a magnetic field using the at least one coil; spraying a fluid using the spray nozzle to clean the brush; and measuring a degree of contamination of the brush by using the sensor to analyze particles collected on the particle collection platform.

Specific details of other embodiments are included in the detailed description and drawings.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

DETAILED DESCRIPTION

Figure 1:
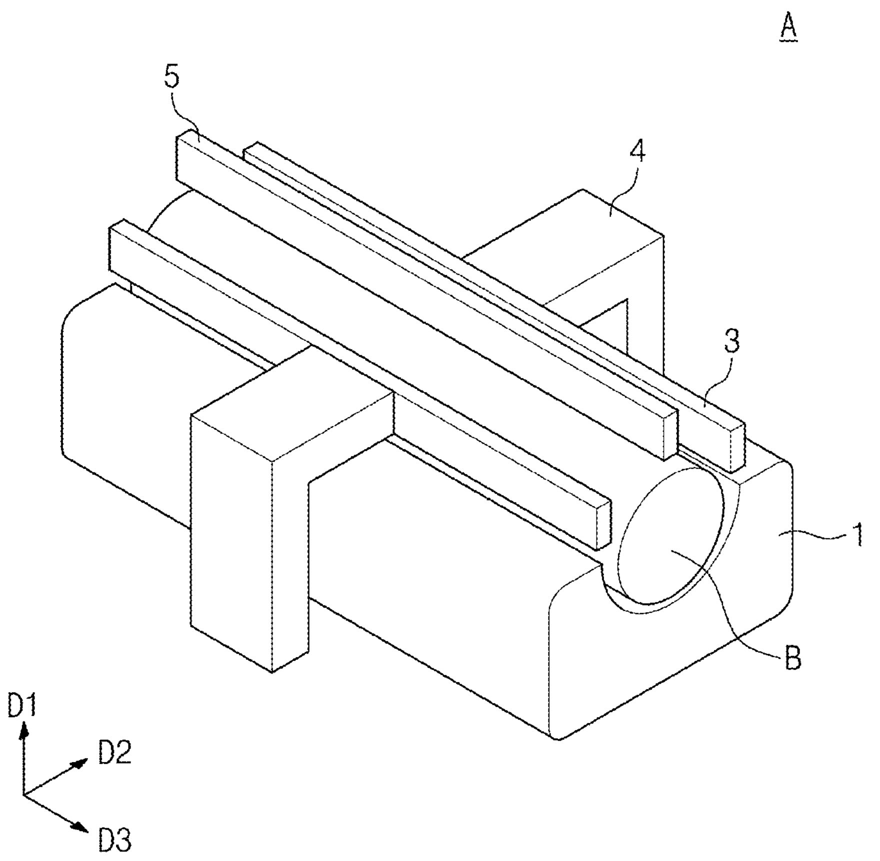
FIG. 1 is a perspective view showing a brush processing apparatus according to embodiments of the inventive concept.

Hereinafter, embodiments of the inventive concept will be described with reference to the attached drawings. The same reference numerals may refer to the same elements throughout the specification.

Hereinafter, D1 may be referred to as a first direction, D2 crossing the first direction D1 may be referred to as a second direction, and D3 crossing each of the first direction D1 and the second direction D2 may be referred to as a third direction.

Throughout the specification, when a component is described as "including" a particular element or group of elements, it is to be understood that the component is formed of only the element or the group of elements, or the element or group of elements may be combined with additional elements to form the component, unless the context indicates otherwise. The term "consisting of," on the other hand, indicates that a component is formed only of the element(s) listed.

Figure 2:
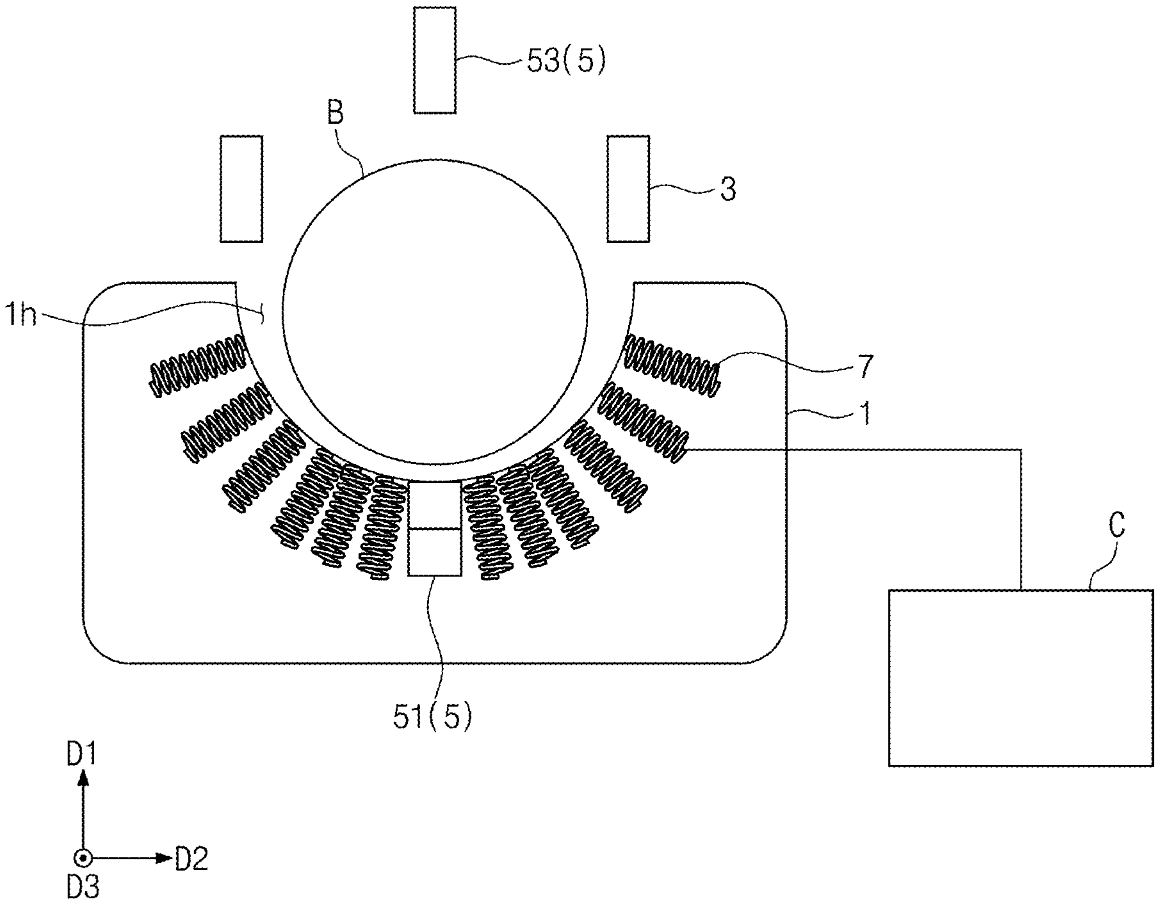
FIG. 2 is a front view showing a brush processing apparatus according to embodiments of the inventive concept.
Figure 3:
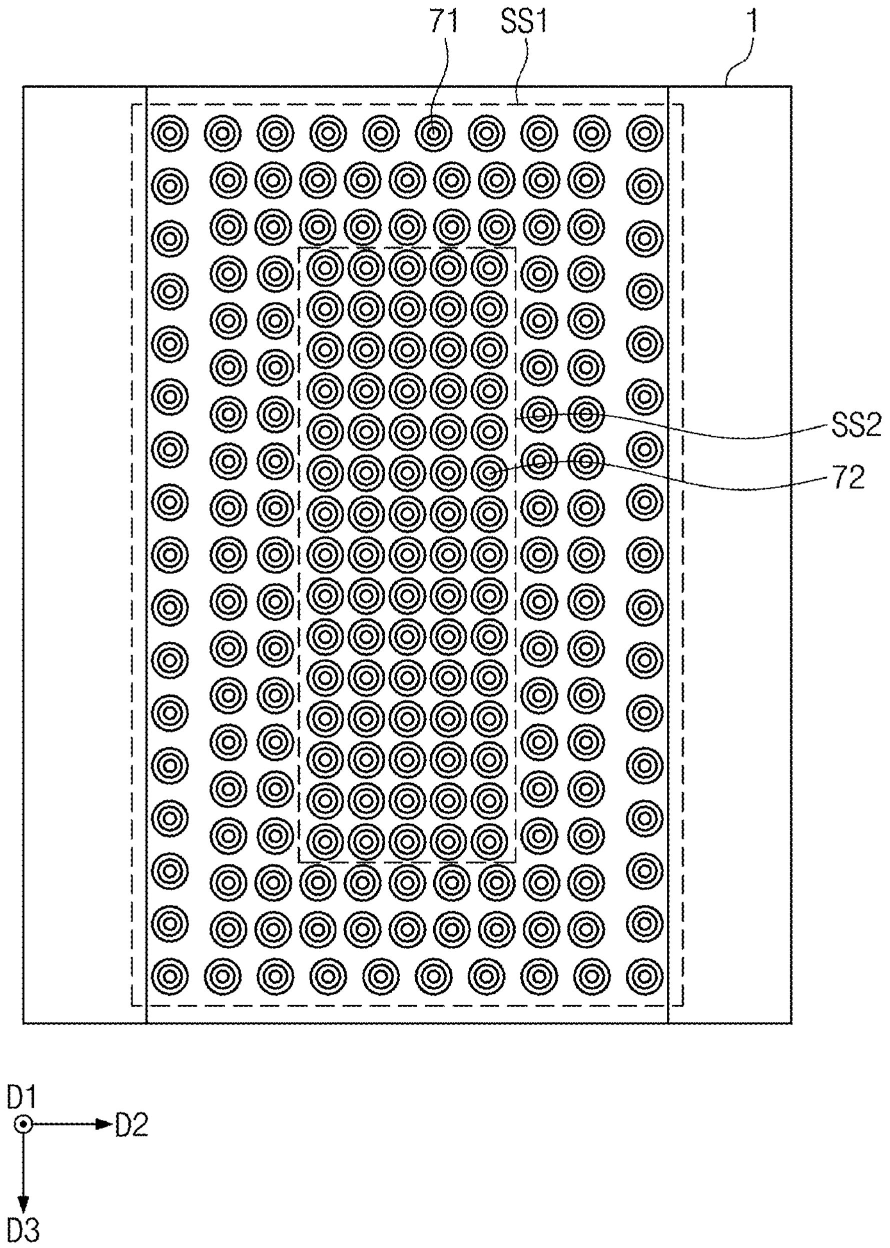
FIG. 3 is a top view showing a measuring body according to embodiments of the inventive concept.
Figure 4:
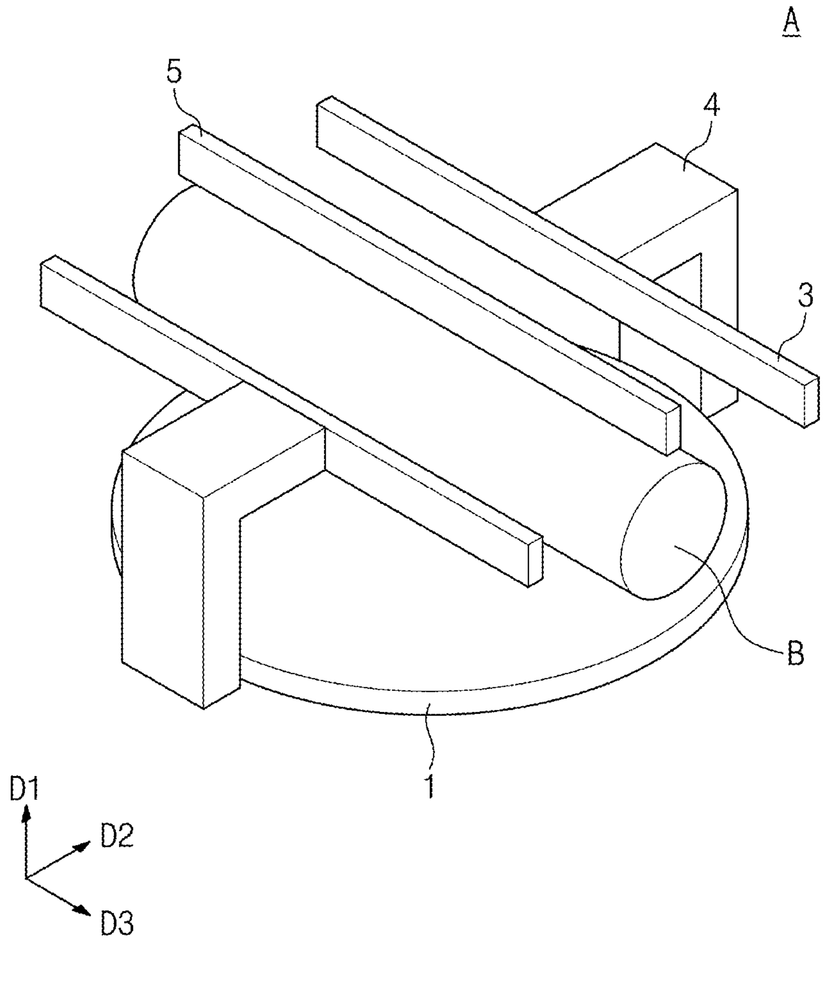
FIG. 4 is a perspective view showing a brush processing apparatus according to embodiments of the inventive concept.
Figure 5:
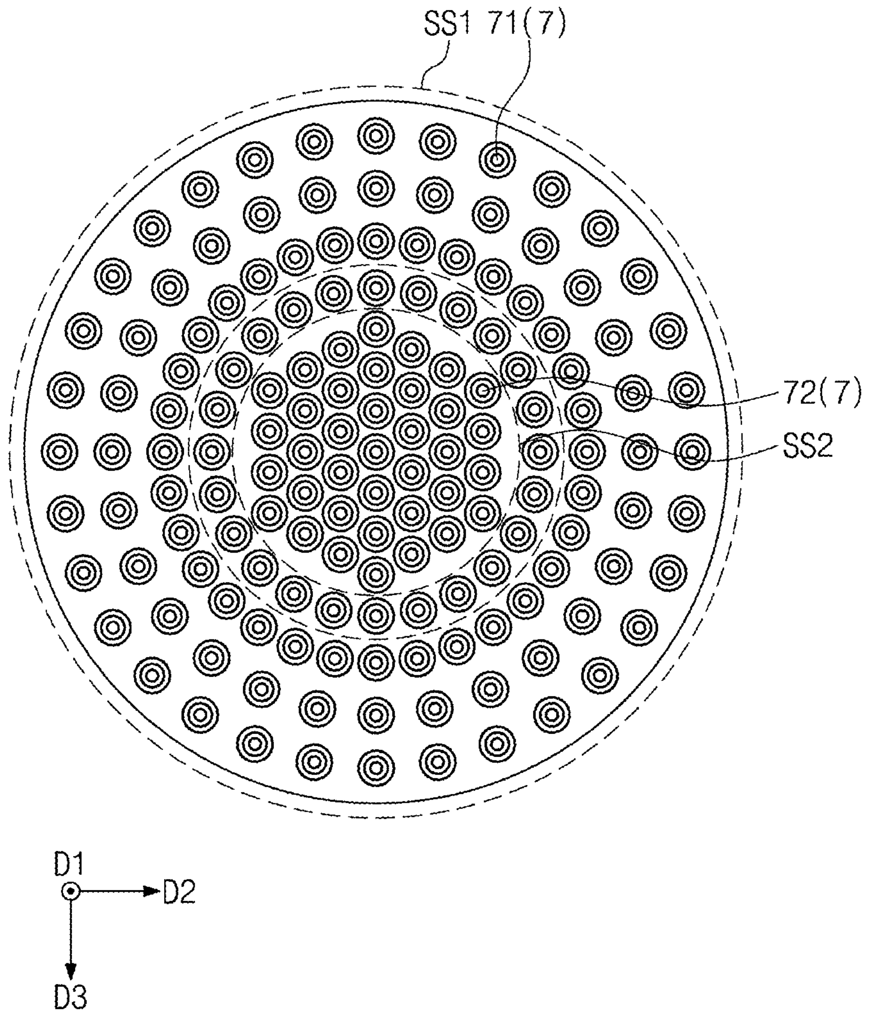
FIG. 5 is a top view showing a measuring body according to embodiments of the inventive concept.

FIG. 1 is a perspective view showing a brush processing apparatus A according to embodiments of the inventive concept, FIG. 2 is a front view showing a brush processing apparatus A according to embodiments of the inventive concept, FIG. 3 is a top view showing a measuring body 1 (e.g., a particle collection platform) according to embodiments of the inventive concept, FIG. 4 is a perspective view showing a brush processing apparatus A according to embodiments of the inventive concept, and FIG. 5 is a top view showing a measuring body 1 according to embodiments of the inventive concept.

Referring to FIGS. 1, 2, and 3, the brush processing apparatus A may include a measuring body 1, a spray nozzle 3, a sensor 5, and a coil 7.

The measuring body 1 may have a rectangular prism shape (see, e.g., FIG. 1) or a plate shape (see, e.g., FIG. 4). The measuring body 1 may include aluminum (Al). Referring to FIGS. 1 and 2, the measuring body 1 may provide a recessed space 1*h* into which at least a portion of a brush B is capable of being inserted. The measuring body 1 in FIGS. 1 and 2 may be a platform such as a tray or receptacle, including a top surface, which may be a particle collection surface, and a body beneath the top surface. As described below, the platform may have coils and in some embodiments measuring equipment formed therein. In some embodiments, the platform may be a brush cleaning receptacle or particle collection receptacle, including a particle collection surface. The platform may be described as a particle collection platform. In some embodiments, the platform may have a plate shape. In this specification, although FIGS. 1 and 2 shows that the measuring body 1 provides the recessed space 1*h* into which a portion of the brush B is inserted, the measuring body 1 may provide a recessed space 1*h* into which the entire brush B is inserted. Various shapes of the recessed space 1*h* will be described later. Referring to FIG. 4, the measuring body 1 may have a circular plate shape.

The spray nozzle 3 may spray fluid. The spray nozzle 3 may spray fluid to remove particles P attached to the brush B. The spray nozzle 3 may spray fluid toward the brush B. The spray nozzle 3 may spray fluid toward the recessed space 1*h*. The spray nozzle 3 may be exposed to the recessed space 1*h* to spray fluid toward the recessed space 1*h*. The arrangement and manner of movement of the spray nozzle 3 will be described later. The fluid may include ultrapure water. However, the fluid may instead or additionally include other types of liquids that may remove particles P from the brush B. The brush processing apparatus A may further include a nozzle driving unit 4. The spray nozzle 3 may be moved by the nozzle driving unit 4. This will be described later.

The coil 7 may be disposed inside the measuring body 1. A plurality of coils 7 may be provided. In this specification, for convenience, the plurality of coils 7 may be treated and described as singular. Various types of particles P may be attached to the brush B. A controller C may be connected to the coil 7. The controller C may be electrically connected to the coil 7. The controller C may generate a magnetic field by supplying power to the coil 7. As current flowing in the coil 7 become stronger, a magnetic field may be stronger. As the number of turns of the coil 7 per unit length is greater, the magnetic field may be stronger. When a plurality of identical coils 7 are provided, as the density of the coils 7 increases, the magnetic field may become stronger. Referring to FIGS. 2, 3, and 5, a plurality of coils 7 may be provided inside the measuring body 1. The plurality of coils 7 may become denser toward a center of the measuring body 1 when viewed in plan view (see, e.g., FIGS. 3 and 5). For example, the coil 7 disposed on the outside of the measuring body 1 (e.g., near an edge of the measuring body 1) may be referred to as a first coil 71. A density of the plurality of coils 7 in a region of the first coil 71 (e.g., near the edge of the measuring body 1) may be low. The coil 7 disposed inside the measuring body 1 (e.g., away from an edge of the measuring body 1) may be referred to as a second coil 72. A density of the plurality of coils 7 in a region of the second coil 72 (e.g., away from the edge of the measuring body 1) may be high. A distance between adjacent first coils 71 may be longer than a distance between adjacent second coils 72. A region where the first coil 71 is placed may be referred to as a first region SS1. A region where the second coil 72 is disposed may be referred to as a second region SS2. The first region SS1 may surround the second region SS2. When the same power is supplied to all coils 7, a magnetic field intensity of the second region SS2 may be greater than a magnetic field intensity of the first region SS1. However, an arrangement of the plurality of coils 7 is not limited thereto. For example, the plurality of coils 7 may be arranged at the same density. A density of the first coils 71 in the first region SS1 may be higher than a density of the second coils 72 in the second region SS2. However, in this specification, FIG. 3 shows the density of the first coils 71 is lower than the density of the second coils 72.

Although not illustrated, a controller can include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to the controller C (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. In addition, the controller can include antennas, network interfaces that provide wireless and/or wire line digital and/or analog interface to one or more networks over one or more network connections (not shown), a power source that provides an appropriate alternating current (AC) or direct current (DC) to power one or more components of the controller, and a bus that allows communication among the various disclosed components of the controller.

The sensor 5 may measure the amount of particles P attached to the brush B. The particles P attached to the brush B may be detached from the brush B and collected on the measuring body 1. The particles P attached to the brush B may be detached from the brush B by the cleaning nozzle 3 and collected on the measuring body 1. The sensor 5 may measure the amount of particles P on the measuring body 1. In this specification, measuring the amount of particles P attached to the brush B may mean measuring the amount of particles P detached from the brush B and collected on the measuring body 1. The particles P collected on the measuring body 1 may be analyzed by the sensor 5. The sensor 5 may include one of a temperature measurement sensor, a light measurement sensor, and a magnetic susceptibility measurement sensor. When the sensor 5 includes a light measurement sensor, the sensor 5 may further include a light source. One of the light measurement sensor and the light source may be located inside the measuring body 1. A method of measuring the amount of particles P in the sensor 5 will be described later.

Figure 6:
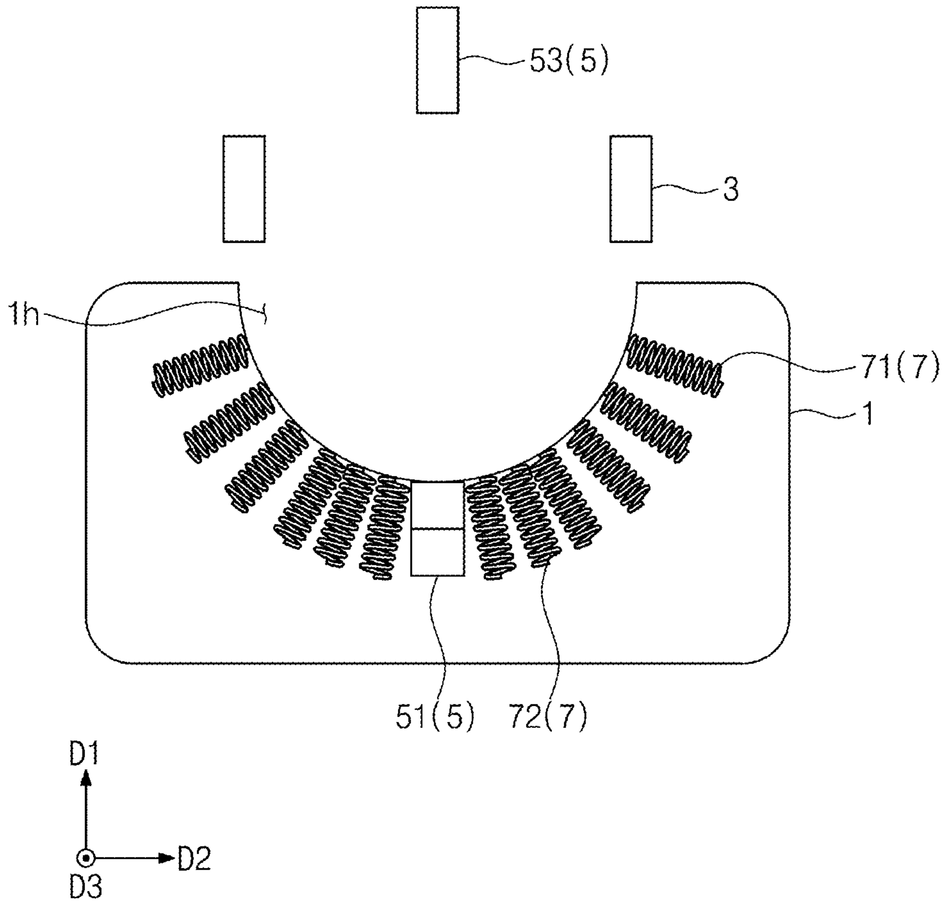
FIG. 6 is a cross-sectional view showing a brush processing apparatus according to embodiments of the inventive concept.
Figure 7:
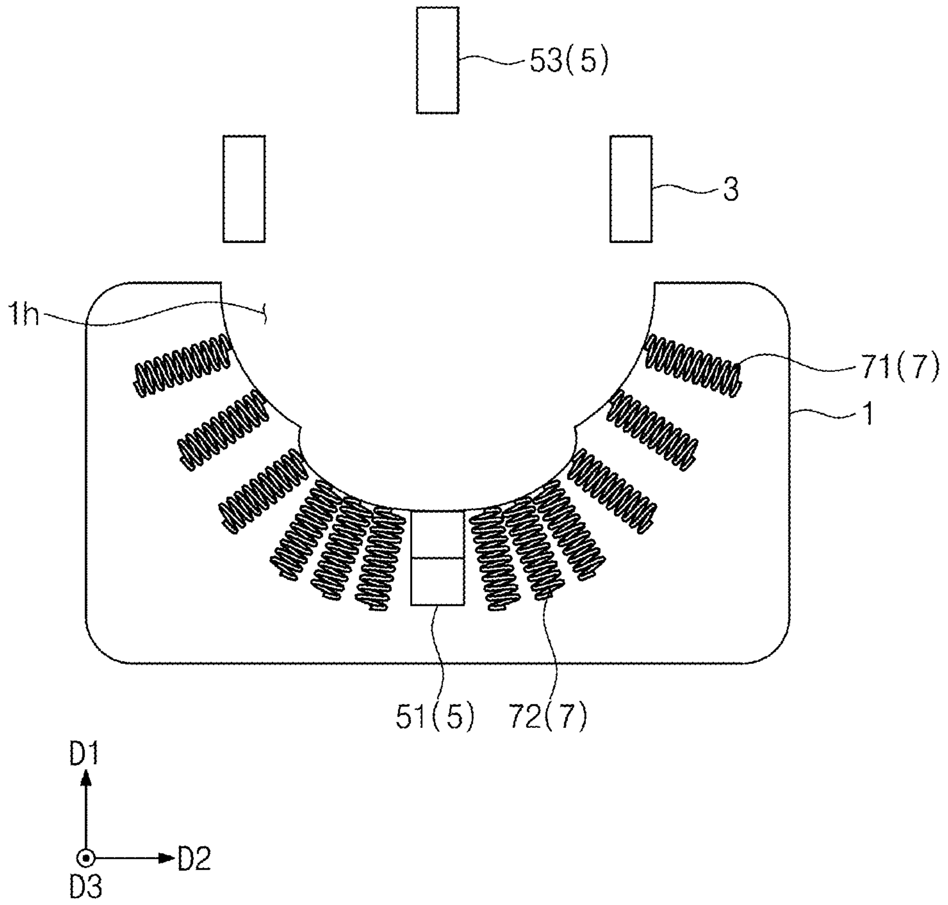
FIG. 7 is a cross-sectional view showing a brush processing apparatus according to embodiments of the inventive concept.
Figure 8:
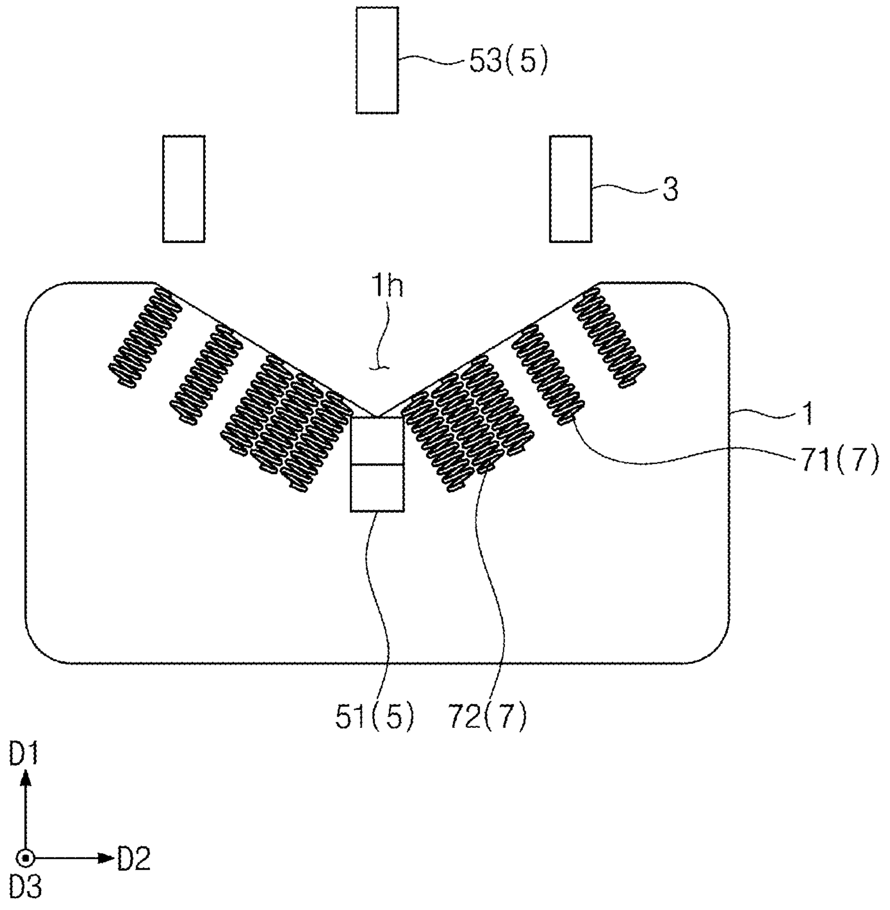
FIG. 8 is a cross-sectional view showing a brush processing apparatus according to embodiments of the inventive concept.

FIG. 6 is a cross-sectional view showing a brush processing apparatus A according to embodiments of the inventive concept, FIG. 7 is a cross-sectional view showing a brush processing apparatus A according to embodiments of the inventive concept, and FIG. 8 is a cross-sectional view showing a brush processing apparatus A according to embodiments of the inventive concept.

Referring to FIG. 6, the recessed space **1*h* may have a U shape in cross-section. Referring to FIG. 7, the recessed space 1*h* may have a double U shape (e.g., a nested U shape) in cross-section. For example, the recessed space 1*h* as shown in FIG. 7 may have a first U shape and a second U shape formed at a bottom region of the first U shape. Referring to FIG. 8, the recessed space 1*h* may have a V shape in cross-section. The particles P may be collected at the bottom of the recessed space 1*h*. The sensor 5 may measure the amount of collected particles P. Referring to FIGS. 6, 7, and 8, when the measuring body 1 provides the recessed space 1*h*, the coil 7 may be arranged to surround the recessed space 1*h*. FIGS. 6, 7, and 8 show the brush processing apparatus A includes a light source 53 and a light measurement sensor 51, but the brush processing apparatus A may also include other types of sensors. The spray nozzle 3 may be disposed to face the recessed space 1*h* to spray fluid into the recessed space 1*h*. The spray nozzle 3 may discharge the particles P collected in the recessed space 1*h* to the outside of the measuring body 1**.

Figure 9:
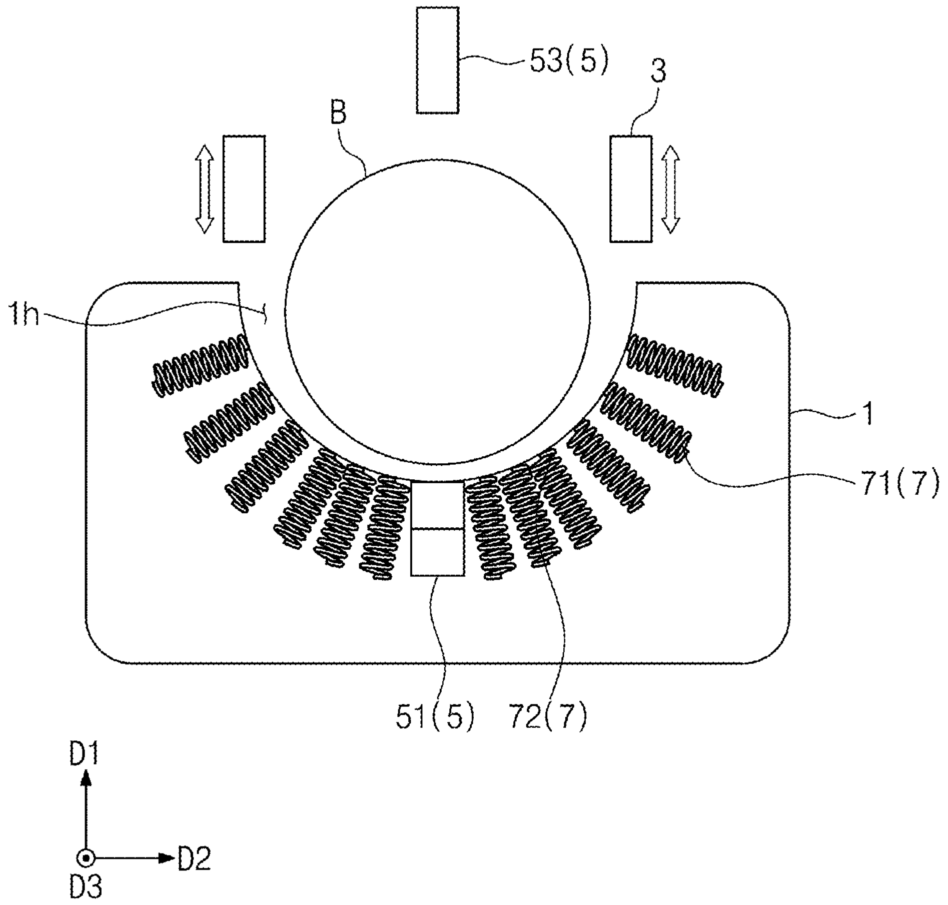
FIG. 9 is a cross-sectional view showing a brush processing apparatus according to embodiments of the inventive concept.
Figure 10:
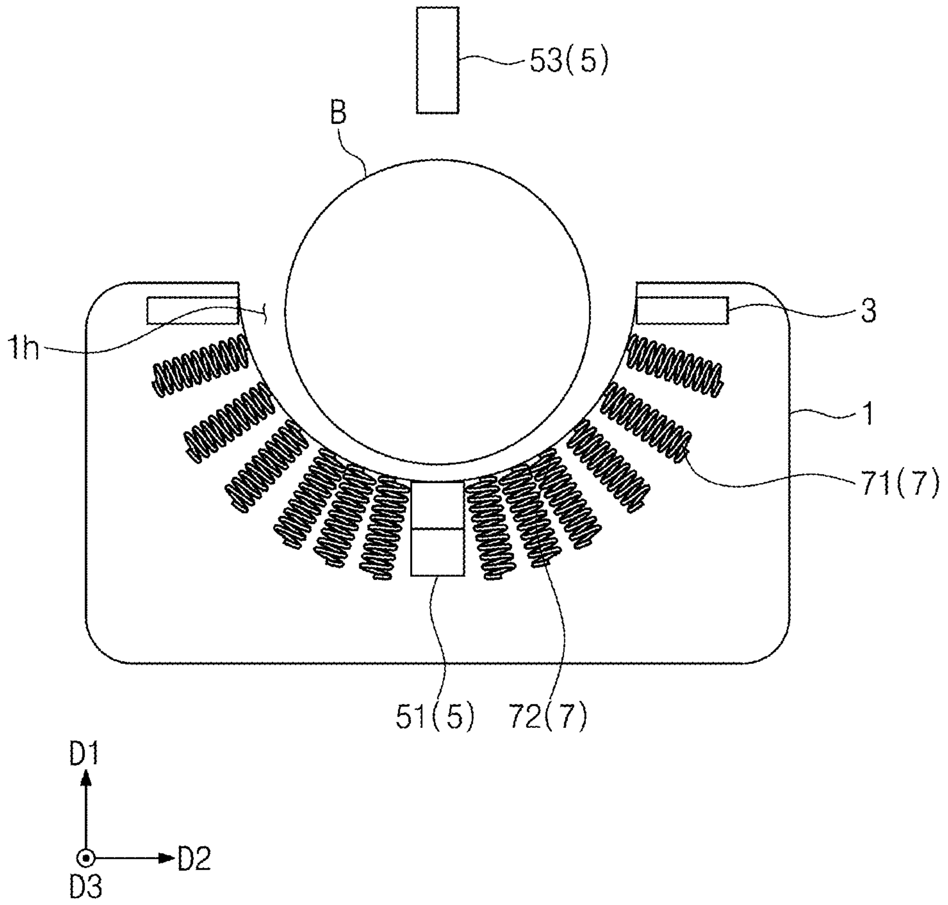
FIG. 10 is a cross-sectional view showing a brush processing apparatus according to embodiments of the inventive concept.

FIG. 9 is a cross-sectional view showing a brush processing apparatus A according to embodiments of the inventive concept, and FIG. 10 is a cross-sectional view showing a brush processing apparatus A according to embodiments of the inventive concept.

Referring to FIG. 9, a brush processing apparatus A may be provided in which a spray nozzle 3 is disposed on the outside of (e.g., spaced apart from or separated from) the measuring body 1. The spray nozzle 3 may move up and down by the nozzle driving unit 4. As the spray nozzle 3 is capable of moving up and down, the brush B may easily be placed in the recessed space **1*h*. For example, when a distance between the spray nozzle 3 and the measuring body 1 is smaller than a diameter of the brush B, it may not be possible to place the brush B in the recessed space 1*h*. After the nozzle driving unit 4 moves the spray nozzle 3 upward, the brush B may be placed in the recessed space 1*h*. However, a direction of movement of the spray nozzle 3 is not limited thereto. The spray nozzle 3 may be moved up and down and left and/or right by the nozzle driving unit 4**.

Referring to FIG. 10, the spray nozzle 3 may be located inside the measuring body 1. For example, the spray nozzle 3 may be embedded in or installed in the measuring body 1. The spray nozzle 3 may spray fluid from the inside of the measuring body 1 toward the recessed space **1*h*. The spray nozzle 3 may spray fluid from the inside of the measuring body 1** toward the brush B.

Figure 11:
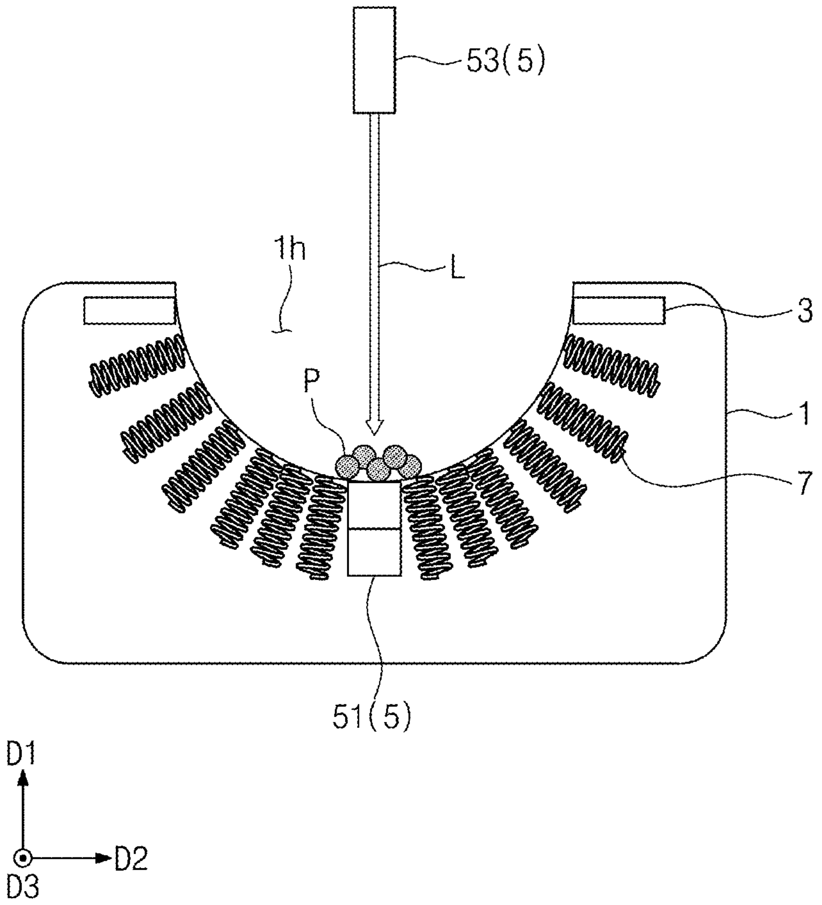
FIG. 11 is a cross-sectional view showing a brush processing apparatus according to embodiments of the inventive concept.
Figure 12:
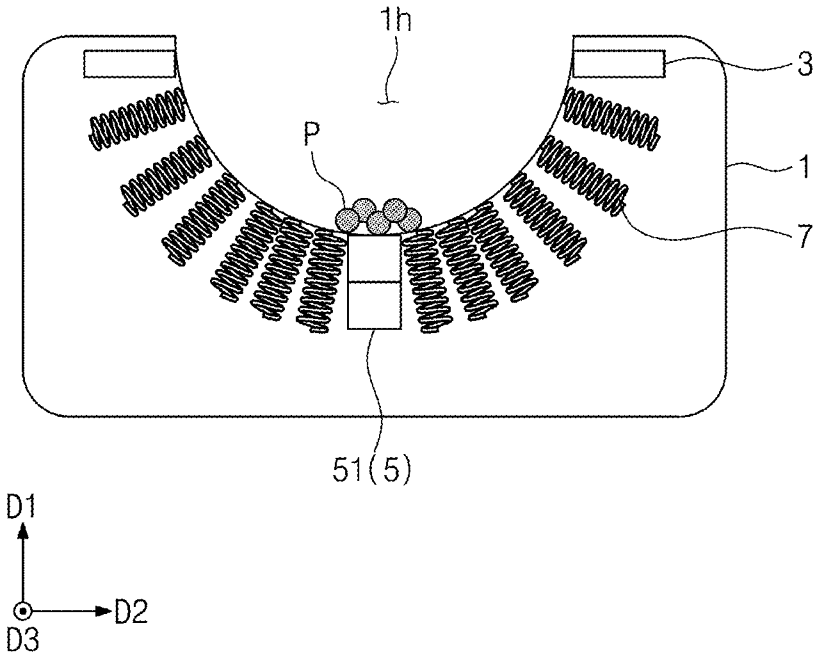
FIG. 12 is a cross-sectional view showing a brush processing apparatus according to embodiments of the inventive concept.

FIG. 11 is a cross-sectional view showing a brush processing apparatus A according to embodiments of the inventive concept, and FIG. 12 is a cross-sectional view showing a brush processing apparatus A according to embodiments of the inventive concept.

Referring to FIGS. 11 and 12, a brush processing apparatus A in which particles P are collected on the measuring body 1 may be provided. Referring to FIG. 11, a brush processing apparatus A including a light source 53 and a light measurement sensor 51 may be provided. One of the light source 53 and the light measurement sensor 51 may be located inside the measuring body 1. For example, one of the light source 53 and the light measurement sensor 51 may be embedded in or installed in the measuring body 1. For example, one of the light source 53 and the light measurement sensor 51 may be embedded or installed at a position in the measuring body 1 at which the particles P gather or are collected after they are removed from the brush B. In this specification, the brush processing apparatus A in which the light measurement sensor 51 is located inside the measuring body 1 may be provided. The particles P may be collected on the light measurement sensor 51. The light source 53 may irradiate light L toward the light measurement sensor 51. The light measurement sensor 51 may measure and analyze a wavelength (e.g., a frequency) of light L. The wavelength or frequency of light L received by the light measurement sensor 51 may change depending on the presence of the particles P. The amount of particles P may be measured by analyzing the wavelength and frequency of the light L emitted from the light source 53 and the light L detected by the light measurement sensor 51. However, the method of analyzing the light L emitted from the light source 53 is not limited thereto. When the light source 53 is located inside the measuring body 1, the light measurement sensor 51 may be located above the light source 53 (e.g., above and spaced apart from the measuring body 1).

Referring to FIG. 12, a brush processing apparatus A including a temperature measurement sensor or a magnetic susceptibility measurement sensor may be provided. The brush processing apparatus A may measure a temperature of the particles P using the temperature measurement sensor. When power is applied to the coil 7, heat may be generated in the coil 7 due to resistance of the coil 7. The particles P may be heated due to the heat of the coil 7. The amount of particles P may be measured by comparing the amount of heat applied to the particles P and the temperature of the particles P.

As another example, the brush processing apparatus A may measure the amount of particles P using the magnetic susceptibility measurement sensor. When current flows through the coil 7, a magnetic field may be formed. The particles P may be magnetized by the magnetic field of the coil 7. A magnetization degree of particles P may be variously changed depending on the amount of particles P. The amount of particles P may be measured by comparing a strength of the magnetic field and the magnetization of the particles P.

The method of measuring the amount of particles P is not limited thereto. The sensor 5 may be used by combining two or more sensors among a temperature measurement sensor, a light measurement sensor, and a magnetometer measurement sensor. The sensor 5 may further include another sensor capable of measuring the amount of particles P.

Figure 13:
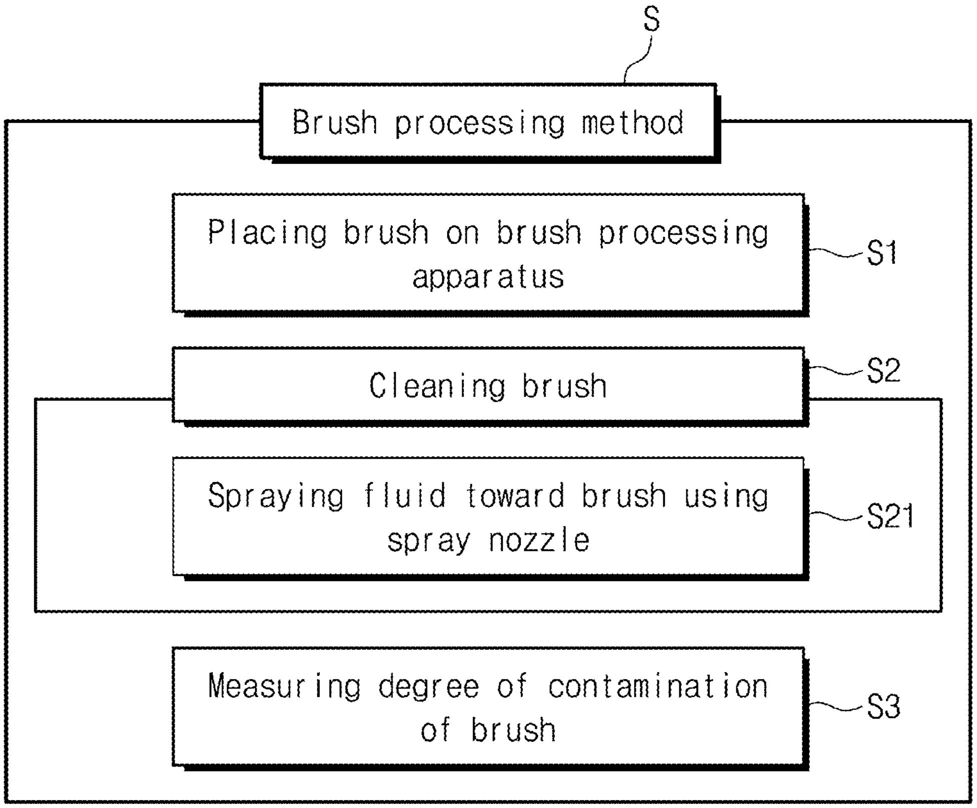
FIG. 13 is a flowchart showing a brush processing method according to embodiments of the inventive concept.
Figure 14:
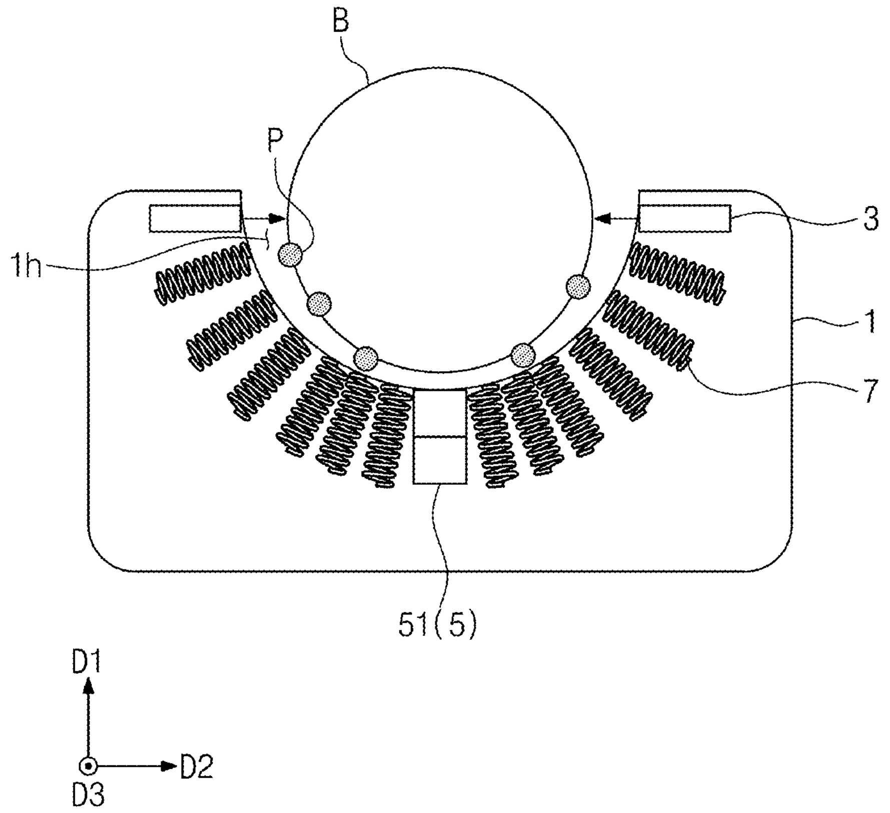
FIG. 14 is a cross-sectional view showing a brush processing apparatus according to embodiments of the inventive concept.
Figure 15:
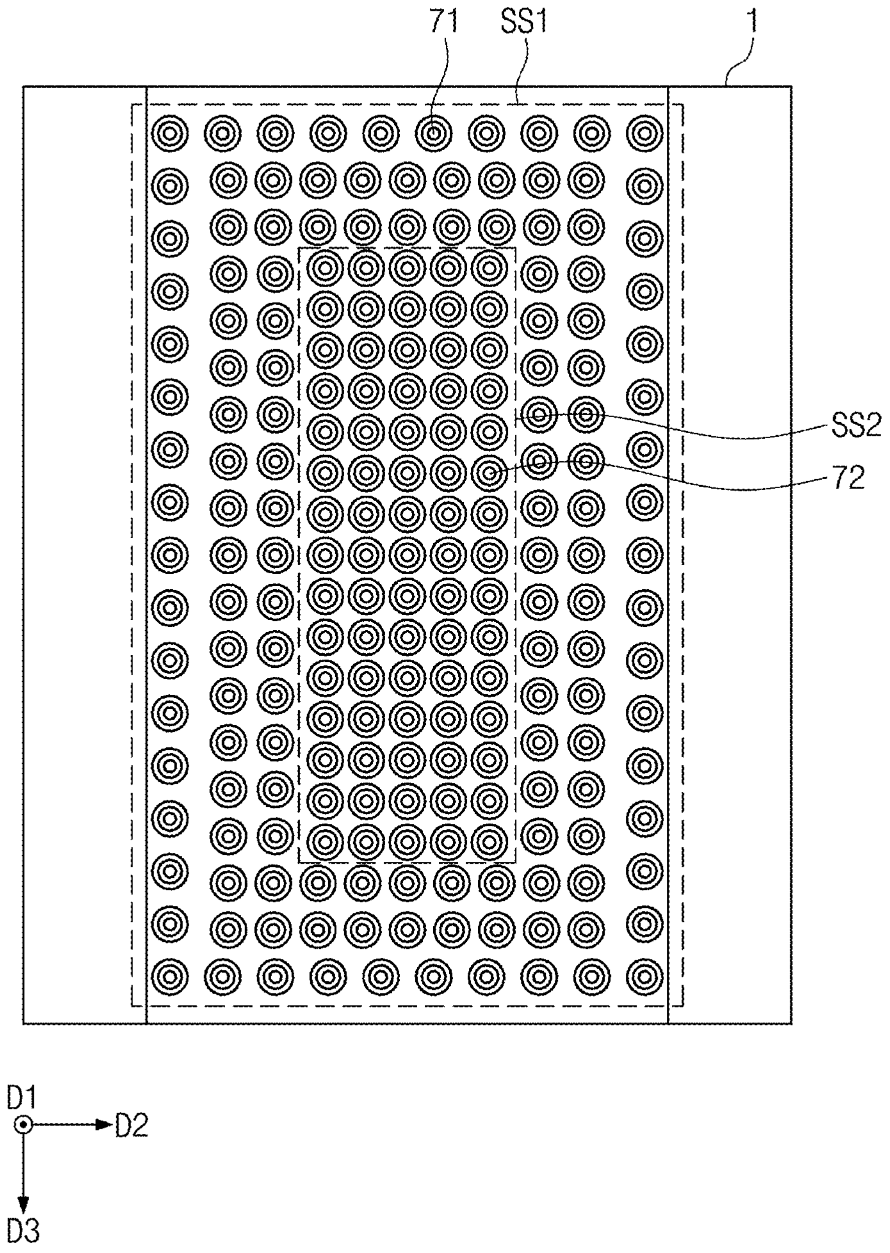
FIG. 15 is a top view showing a measuring body according to embodiments of the inventive concept.
Figure 16:
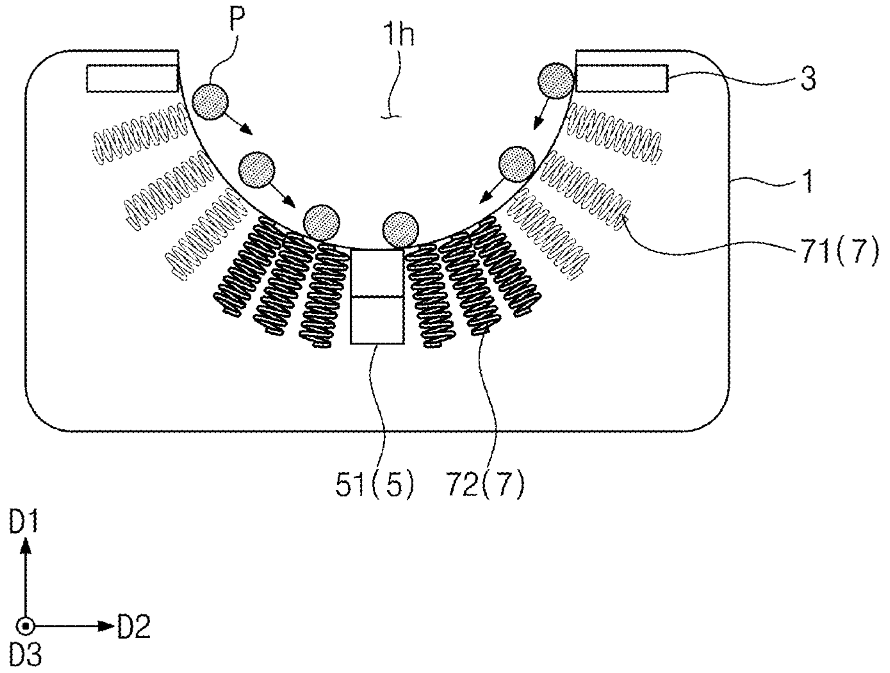
FIG. 16 is a cross-sectional view showing a brush processing apparatus according to embodiments of the inventive concept.
Figure 17:
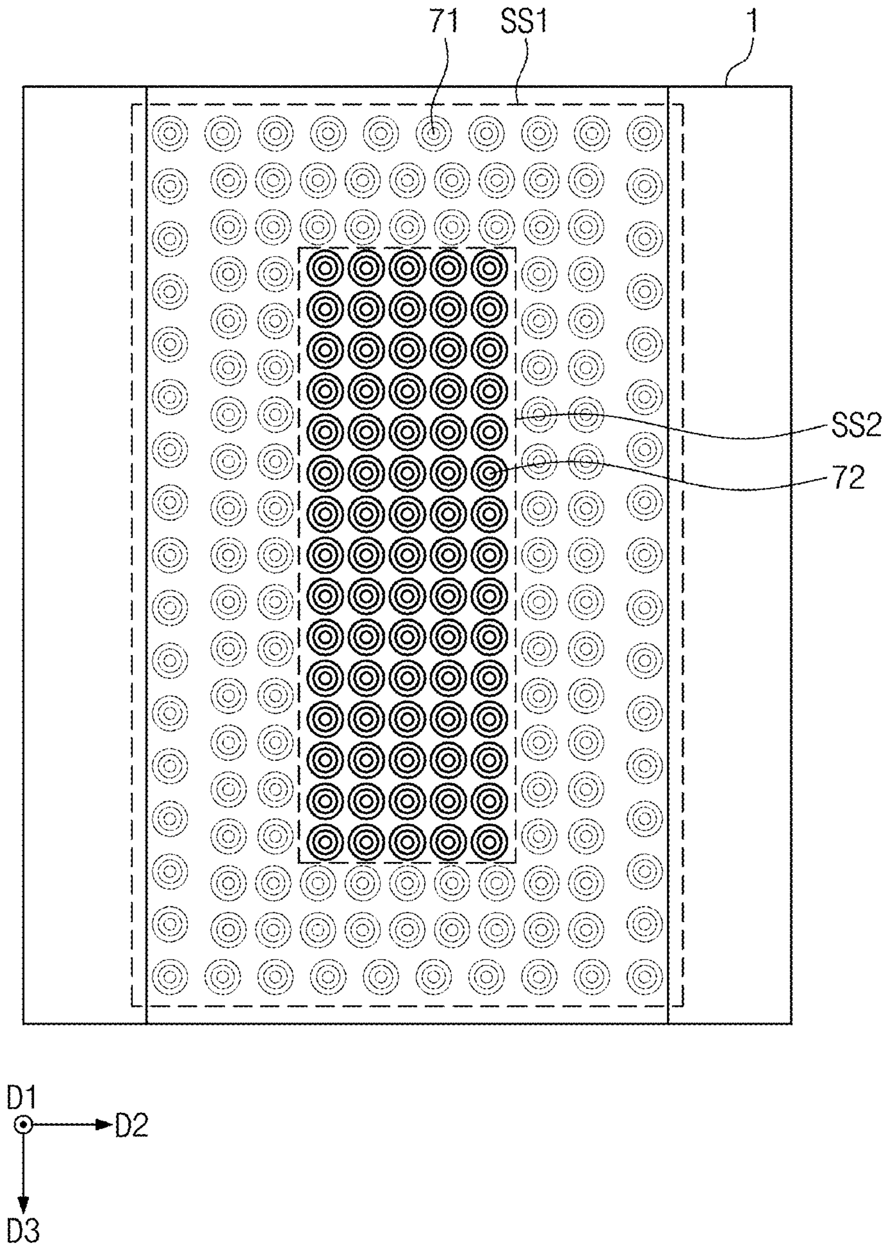
FIG. 17 is a top view showing a measuring body according to embodiments of the inventive concept.

FIG. 13 is a flowchart showing a brush processing method S according to embodiments of the inventive concept, FIG. 14 is a cross-sectional view showing a brush processing apparatus A according to embodiments of the inventive concept, FIG. 15 is a top view showing a measuring body 1 according to embodiments of the inventive concept, FIG. 16 is a cross-sectional view showing a brush processing apparatus A according to embodiments of the inventive concept, and FIG. 17 is a top view showing a measuring body 1 according to embodiments of the inventive concept.

Referring to FIG. 13, the brush processing method S may include placing the brush B on the brush processing apparatus A in S1. For example, the brush B may be placed on the brush processing apparatus A by a user or by a machine such as a robot arm. The brush processing method S may further include cleaning the brush B in S2, and measuring a degree of contamination of the brush B in S3. The cleaning of the brush B in S2 may include spraying fluid toward the brush B using the spray nozzle 3 in S21. In this specification, the measuring of the degree of contamination of the brush B may mean measuring the amount of particles P attached to the brush B. As the amount of particles P attached to the brush B increases, the degree of contamination of the brush B may increase. As the amount of particles P attached to the brush B decreases, the degree of contamination of the brush B may decrease.

Referring to FIG. 14, a brush processing apparatus A may be provided in which a spray nozzle 3 sprays fluid toward the brush B. For example, the spray nozzle 3 may spray the fluid directly at the brush B or at an angle toward the brush B. For example, the brush B may rotate while the fluid is sprayed by the spray nozzle 3. The spray nozzle 3 may include one or more holes that may be opened or closed, for example, by a controller, to direct the flow of the fluid. As the spray nozzle 3 sprays fluid, the particles P attached to the brush B may be detached from the brush B. Referring to FIGS. 14 and 15, a brush processing apparatus A in which power is supplied to a plurality of coils 7 may be provided. Power may be supplied to the first coil 71 and the second coil 72. The first coil 71 and the second coil 72 may form a magnetic field to attract the particles P. Referring to FIGS. 16 and 17, the power supplied to the first coil 71 in the first region SS1 may be reduced. The current supplied to the first coil 71 may therefore decrease. For example, power may not be supplied to the first coil 71. When the strength of the magnetic field formed by the first coil 71 decreases, the particles on the first coil 71 may move onto the second coil 72. The particles P may be collected in the second region SS2. The sensor 5 may measure the amount of particles P on the second coil 72.

According to the brush processing apparatus and the brush processing method using the same according to embodiments of the inventive concept, the particles attached to the brush may be collected on the measuring body. The particles attached to the brush may be detached from the brush by the spray nozzle. The particles detached from the brush may be collected on the measuring body. When the measuring body provides the recessed space, the particles may be located in the recessed space. When the measuring body has the plate shape that does not provide a recessed space, the particles may be located on the measuring body. The coil may be located inside the measuring body. The magnetic field may be created by supplying power to the coil. The particles may be collected on the measuring body by the formed magnetic field. The magnetic field may increase a bonding force between the particles and the measuring body. After applying the magnetic field to the first coil and the second coil to separate the particles from the brush, the power applied to the first coil may be reduced. The current flowing in the first coil may be weaker than the current flowing in the second coil. The strength of the magnetic field formed by the second coil may be greater than the strength of the magnetic field formed by the first coil. The particles may then move (e.g., consolidate) onto the second coil.

According to the brush processing apparatus and the brush processing method using the same according to embodiments of the inventive concept, the amount of particles may be measured using the sensor. The sensor may include a temperature measurement sensor, a light measurement sensor, and/or a magnetic susceptibility measurement sensor. The sensor may measure the amount of particles located on the measuring body. The sensor may measure the amount of particles using changes in light received by the sensor. The sensor may measure the amount of particles using the temperature or magnetization of the particles. However, the sensor may further include other types of sensors capable of measuring the amount of particles.

According to the brush processing apparatus and the brush processing method using the same according to embodiments of the inventive concept, the degree of contamination of the brush may be measured after cleaning the brush. The brush processing apparatus may include a spray nozzle (e.g., a cleaning nozzle) and a sensor. Instead of directly measuring the amount of particles attached to the brush, the brush processing apparatus may clean the brush and then measure the amount of particles attached to the brush.

According to the brush processing apparatus and the brush processing method using the same of the inventive concept, the particles attached to the brush may be removed.

According to the brush processing apparatus and the brush processing method using the same of the inventive concept, the amount of particles attached to the brush may be measured.

According to the brush processing apparatus and the brush processing method using the same of the inventive concept, the particles may be collected in the specific region.

According to the brush processing apparatus and the brush processing method using the same of the inventive concept, the amount of particles may be measured by measuring the temperature of the particles, the wavelength of light, and the magnetization of the particles.

According to the brush processing apparatus and the brush processing method using the same of the inventive concept, the amount of particles in the brush may be measured, thereby preventing the reverse contamination of the substrate by suggesting the brush replacement cycle in advance before the brush becomes severely contaminated.

The effects of the inventive concept are not limited to the effects mentioned above, and other effects not mentioned will be clearly understood by those skilled in the art from the description below.

While embodiments are described above, a person skilled in the art may understand that many modifications and variations are made without departing from the spirit and scope of the inventive concept. Accordingly, the example embodiments of the inventive concept should be considered in all respects as illustrative and not restrictive.

What is claimed is:

1. A brush processing apparatus comprising:
a particle collection platform;
at least one coil inside the particle collection platform and configured to generate a magnetic field;
a spray nozzle configured to spray fluid to clean a brush; and
a sensor configured to analyze particles collected on the particle collection platform,
wherein the particle collection platform includes a recessed space into which at least a portion of the brush is configured to be inserted.

2. The brush processing apparatus of claim 1, wherein the particle collection platform has a circular plate shape, and
wherein the at least one coil includes a plurality of coils.

3. The brush processing apparatus of claim 1,
wherein the recessed space has one of a U shape, a nested U shape, and a V shape when viewed in cross-section.

4. The brush processing apparatus of claim 3, wherein the spray nozzle is inside the particle collection platform, and
wherein the spray nozzle is exposed to the recessed space and configured to spray fluid toward the recessed space.

5. The brush processing apparatus of claim 3, wherein the spray nozzle is spaced upward from the particle collection platform, and
wherein the spray nozzle is configured to spray fluid toward the recessed space.

6. The brush processing apparatus of claim 1, further comprising a controller configured to supply power to the at least one coil.

7. The brush processing apparatus of claim 1, further comprising a nozzle driving unit configured to move the spray nozzle,
wherein the spray nozzle is spaced upward from the particle collection platform.

8. The brush processing apparatus of claim 1, wherein the sensor includes one of a temperature measurement sensor, a light measurement sensor, and a magnetic susceptibility measurement sensor.

9. The brush processing apparatus of claim 1, wherein the particle collection platform includes aluminum (Al).

10. A brush processing apparatus comprising:
a particle collection platform;
at least one coil inside the particle collection platform and configured to generate a magnetic field;
a spray nozzle configured to spray fluid to clean a brush; and
a sensor configured to analyze particles collected on the particle collection platform,
wherein the brush processing apparatus includes a plurality of coils, the at least one coil being included among the plurality of coils, and
wherein a density of the plurality of coils increases toward a center of the particle collection platform.

11. A brush processing apparatus comprising:
a particle collection platform;
at least one coil inside the particle collection platform and configured to generate a magnetic field;
a spray nozzle configured to spray fluid to clean a brush; and
a sensor configured to analyze particles collected on the particle collection platform,
wherein the sensor includes:
a light measurement sensor configured to measure a wavelength of light; and
a light source configured to radiate light toward the light measurement sensor, and
wherein one of the light measurement sensor and the light source is inside the particle collection platform.

12. A brush processing apparatus comprising:
a particle collection platform having a rectangular prism shape or a plate shape;
a plurality of coils inside the particle collection platform and configured to generate a magnetic field;
a spray nozzle configured to spray fluid toward the particle collection platform; and
a sensor configured to analyze particles collected on the particle collection platform,
wherein the particle collection platform includes a recessed space in which a brush is configured to be positioned.

13. The brush processing apparatus of claim 12,
wherein the plurality of coils are arranged to surround the recessed space.

* * * * *